United States Patent
Zheng et al.

(10) Patent No.: US 10,122,612 B2
(45) Date of Patent: Nov. 6, 2018

(54) METHOD AND APPARATUS FOR NETWORK DIAGNOSIS PROCESSING

(71) Applicant: Huawei Technologies Co., Ltd., Shenzhen (CN)

(72) Inventors: Hewen Zheng, Shenzhen (CN); Hongguang Guan, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 161 days.

(21) Appl. No.: 15/256,056

(22) Filed: Sep. 2, 2016

(65) Prior Publication Data
US 2016/0373335 A1  Dec. 22, 2016

Related U.S. Application Data

(63) Continuation of application No. PCT/CN2015/073175, filed on Feb. 16, 2015.

(30) Foreign Application Priority Data

Mar. 5, 2014  (CN) .......................... 2014 1 0079062

(51) Int. Cl.
*H04L 12/26*  (2006.01)
*H04L 12/24*  (2006.01)
*H04L 1/00*  (2006.01)

(52) U.S. Cl.
CPC .............. *H04L 43/50* (2013.01); *H04L 41/14* (2013.01)

(58) Field of Classification Search
CPC ................................. H04L 43/50; H04L 41/14
(Continued)

(56) References Cited

U.S. PATENT DOCUMENTS 6,775,239 B1  8/2004 Akita et al.
7,983,174 B1  7/2011 Monaghan et al.
(Continued)

FOREIGN PATENT DOCUMENTS

CN  102594613 A  7/2012
CN  103401754 A  11/2013
(Continued)

OTHER PUBLICATIONS

Mizrahi et al., "An Overview of Operations, Administration and Maintenance (OAM) Tools draft-ietf-opaawg-oam-overview-14. Txt," Internet Draft, pp. 1-49, Operations and Management Area Working Group (Feb. 18, 2014).
(Continued)

*Primary Examiner* — Faisal Choudhury
(74) *Attorney, Agent, or Firm* — Leydig, Voit & Mayer, Ltd.

(57) ABSTRACT

A method for network diagnosis processing of the present invention includes: receiving, by a first network tunnel source end, at a first network layer, a network diagnosis instruction sent by an instruction center; sending, by the first network tunnel source end, at the first network layer, a diagnosis message to a first network layer of a first network tunnel peer end, where the diagnosis message carries characteristic information, so that the first network tunnel peer end reports, at the first network layer, a diagnosis result including the characteristic information to the instruction center; and sending, by the first network tunnel source end, at the second network layer, the diagnosis message to a second network layer of the first network tunnel peer end, so that the first network tunnel peer end reports, at the second network layer, a diagnosis result including the characteristic information to the instruction center.

20 Claims, 7 Drawing Sheets

(58) Field of Classification Search
USPC .................................................. 370/252
See application file for complete search history.

(56) References Cited

U.S. PATENT DOCUMENTS

| | | | |
|---|---|---|---|
| 2008/0285466 A1* | 11/2008 | Salam | H04L 41/0226 370/241.1 |
| 2010/0238812 A1 | 9/2010 | Boutros et al. | |
| 2012/0163189 A1 | 6/2012 | Allan et al. | |
| 2013/0117449 A1 | 5/2013 | Hares et al. | |
| 2016/0210427 A1* | 7/2016 | Mynhier | G16H 50/20 |

FOREIGN PATENT DOCUMENTS

| | | |
|---|---|---|
| EP | 2469760 A1 | 6/2012 |
| JP | 2001127761 A | 5/2001 |

OTHER PUBLICATIONS

"IEEE Standard for Local and metropolitan area networks—Virtual Bridged Local Area Networks Amendment 5: Connectivity Fault Management," IEEE Computer Society, IEEE Std 802.1 ag, pp. i-246, Institute of Electrical and Electronics Engineers, New York, New York (2007).

"IEEE Standard for Information technology—Telecommunications and information exchange between systems—Local and metropolitan area networks—Specific requirements Part 3: Carrier Sense Multiple Access with Collision Detection (CSMA/CD) Access Method and Physical Layer Specifications Amendment: Media Access Control Parameters, Physical Layer, and Management Parameters for Subscriber Access Networks," IEEE Computer Society, IEEE std 802.3ah, pp. i-623, Institute of Electrical and Electronics Engineers, New York, New York (Sep. 7, 2004).

Cahoun et al., "Diameter Base Protocol," Standards Track, RFC-3588, pp. 1-129, Network Working Group (Sep. 2003).

Lim et al., MIME Type Registration for MPEG-4, Standards Track, RFC-4437, pp. 1-11, Network Working Group (Mar. 2006).

Vigoureux et al., "Requirements for Operations, Administration, and Maintenance (OAM) in MPLS Transport Networks," Standards Track, RFC-5860, pp. 1-17, Internet Engineering Task Force (May 2010).

Busi et al., "Operations, Administration, and Maintenance Framework for MPLS-Based Transport Networks," Informational, RFC-6371, pp. 1-62, Internet Engineering Task Force (Sep. 2011).

* cited by examiner

METHOD AND APPARATUS FOR NETWORK DIAGNOSIS PROCESSING

CROSS-REFERENCE TO RELATED APPLICATIONS

This application is a continuation of International Application No. PCT/CN2015/073175, filed on Feb. 16, 2015, which claims priority to Chinese Patent Application No. 201410079062.6, filed on Mar. 5, 2014, both of which are incorporated by reference in their entireties.

TECHNICAL FIELD

Embodiments of the present invention relate to the field of communications technologies and in particular, to a method and an apparatus for network diagnosis processing.

BACKGROUND

Devices on two ends of network communications usually span multiple network layers and network management domains, and two terminal devices communicate with each other using Internet Protocol (IP). An IP packet used for communication between the two terminal devices is encapsulated in a network tunnel by a network virtualization overlay endpoint (NVE), and this tunnel actually adds an IP data packet header to the IP packet used for communication between two terminals. A network tunnel packet is carried by an Ethernet link layer or a multi-protocol label switching MPLS tunnel over the Ethernet link layer.

In the prior art, operation, administration and maintenance (OAM) technologies cannot span network layers. Moreover, OAM is terminated at a peer end of a link and cannot go beyond a boundary of its network layer. This means that, if a failure such as service interruption or communication quality degradation occurs in an end-to-end communication network, checks need to be performed using OAM at each layer and each domain, resulting in multiple independent OAM procedures.

Because there are multiple independent OAM procedures, problems of low efficiency and low accuracy are caused in a process of processing, analyzing and associating diagnosis reports among various network layers or various network management domains.

SUMMARY

Embodiments of the present invention provide a method and an apparatus for network diagnosis processing, so as to overcome problems, caused by multiple independent OAM procedures existing in the prior art, of low efficiency and low accuracy in a process of processing, analyzing and associating diagnosis reports among various network layers or various network management domains.

In a first aspect, the present invention provides a method for network diagnosis processing, including:

receiving, by a first network tunnel source end, at a first network layer, a network diagnosis instruction sent by an instruction center;

sending, by the first network tunnel source end, at the first network layer, a diagnosis message to a first network layer of a first network tunnel peer end and a second network layer of the first network tunnel source end, where the diagnosis message carries characteristic information, so that the first network tunnel peer end reports, at the first network layer, a diagnosis result including the characteristic information to the instruction center; and sending, by the first network tunnel source end, at the second network layer, the diagnosis message to a second network layer of the first network tunnel peer end, so that the first network tunnel peer end reports, at the second network layer, a diagnosis result including the characteristic information to the instruction center.

In a first possible implementation manner of the first aspect, the method further includes:

sending, by the first network tunnel source end, at the second network layer, the diagnosis message to a third network layer of the first network tunnel source end; and sending, by the first network tunnel source end, at the third network layer, the diagnosis message to a third network layer of the first network tunnel peer end, so that the first network tunnel peer end reports, at the third network layer, a diagnosis result including the characteristic information to the instruction center;

or, sending, by the first network tunnel source end, at the first network layer, the diagnosis message to a third network layer of the first network tunnel source end; and sending, by the first network tunnel source end, at the third network layer, the diagnosis message to a third network layer of the first network tunnel peer end, so that the first network tunnel peer end reports, at the third network layer, a diagnosis result including the characteristic information to the instruction center.

With reference to the first aspect or the first possible implementation manner of the first aspect, in a second possible implementation manner of the first aspect, the first network layer is a tunnel layer, the second network layer is a network protocol layer, and the third network layer is a data link layer.

With reference to any possible implementation manner of the first aspect to the second possible implementation manner of the first aspect, in a third possible implementation manner of the first aspect, the characteristic information includes tenant information and a test information serial number.

With reference to any possible implementation manner of the first aspect to the third possible implementation manner of the first aspect, in a fourth possible implementation manner of the first aspect, the characteristic information is carried in a payload field of the diagnosis message.

With reference to the first possible implementation manner of the first aspect, in a fifth possible implementation manner of the first aspect, the method further includes:

sending, by the first network tunnel source end, at the first network layer, cross-management domain notification information to the first network layer of the first network tunnel peer end, so that the first network tunnel peer end sends, at the first network layer, the diagnosis message to a first network layer of a second network tunnel source end.

With reference to the fifth possible implementation manner of the first aspect, in a sixth possible implementation manner of the first aspect, the method further includes:

sending, by the first network tunnel source end, at the second network layer, the cross-management domain notification information to the second network layer of the first network tunnel peer end, so that the first network tunnel peer end sends, at the second network layer, the diagnosis message to a second network layer of the second network tunnel source end;

and/or, sending, by the first network tunnel source end, at the third network layer, the cross-management domain notification information to the third network layer of the first network tunnel peer end, so that the first network tunnel peer end sends, at the third network layer, the diagnosis message to a third network layer of the second network tunnel source end.

With reference to the fifth or sixth possible implementation manner of the first aspect, in a seventh possible implementation manner of the first aspect, the cross-management domain notification information is carried in a diagnosis message that is sent by each network layer of the first network tunnel source end to a corresponding network layer of the first network tunnel peer end.

In a second aspect, an embodiment of the present invention provides a method for network diagnosis processing, including:

receiving, by a second network tunnel source end, at a first network layer, a diagnosis message sent by a first network tunnel peer end, where the diagnosis message carries characteristic information;

sending, by the second network tunnel source end, at the first network layer, the diagnosis message to a first network layer of a second network tunnel peer end and a second network layer of the second network tunnel source end, where the diagnosis message carries the characteristic information, so that the second network tunnel peer end reports, at the first network layer, a diagnosis result including the characteristic information to an instruction center; and sending, by the second network tunnel source end, at the second network layer, the diagnosis message to a second network layer of the second network tunnel peer end, so that the first network tunnel peer end reports, at the second network layer, a diagnosis result including the characteristic information to the instruction center.

In a third aspect, an embodiment of the present invention provides an instruction center, including:

a sending module, configured to send a network diagnosis instruction to a first network layer of a first network tunnel source end, so that the first network tunnel source end sends, at the first network layer, a diagnosis message to a first network layer of a first network tunnel peer end and a second network layer of the first network tunnel source end, and the second network layer of the first network tunnel source end sends the diagnosis message to a second network layer of the first network tunnel peer end, where the diagnosis message includes characteristic information;

a first receiving module, configured to receive diagnosis results that are reported by the first network layer, the second network layer, and a third network layer of the first network tunnel peer end according to the diagnosis message, where the diagnosis result includes the characteristic information;

a first associating module, configured to perform, according to the characteristic information, an association analysis on the diagnosis results that are reported by the first network layer, the second network layer, and the third network layer;

a second receiving module, configured to receive diagnosis results that are reported by a first network layer, a second network layer, and a third network layer of a second network tunnel peer end according to the diagnosis message, where the diagnosis result includes the characteristic information;

a second associating module, configured to perform, according to the characteristic information, an association analysis on the diagnosis results that are reported by the first network layer, the second network layer, and the third network layer of the first network tunnel peer end and by the first network layer, the second network layer, and the third network layer of the second network tunnel peer end.

In a fourth aspect, an embodiment of the present invention provides a network node device, including:

a receiving module, configured to receive, at a first network layer, a network diagnosis instruction sent by an instruction center;

a first sending module, configured to send, at the first network layer, a diagnosis message to a first network layer of a first network tunnel peer end and a second network layer of a first network tunnel source end, where the diagnosis message carries characteristic information, so that the first network tunnel peer end reports, at the first network layer, a diagnosis result including the characteristic information to the instruction center; and a second sending module, configured to send, at the second network layer, the diagnosis message to a second network layer of the first network tunnel peer end, so that the first network tunnel peer end reports, at the second network layer, a diagnosis result including the characteristic information to the instruction center.

In a first possible implementation manner of the fourth aspect, the device further includes:

a third sending module, configured to send, at the second network layer, the diagnosis message to a third network layer of the first network tunnel source end; and a fourth sending module, configured to send, at the third network layer, the diagnosis message to a third network layer of the first network tunnel peer end, so that the first network tunnel peer end reports, at the third network layer, a diagnosis result including the characteristic information to the instruction center;

or, a fifth sending module, configured to send, at the first network layer, the diagnosis message to a third network layer of the first network tunnel source end; and a sixth sending module, configured to send, at the third network layer, the diagnosis message to a third network layer of the first network tunnel peer end, so that the first network tunnel peer end reports, at the third network layer, a diagnosis result including the characteristic information to the instruction center.

With reference to the fourth aspect or the first possible implementation manner of the fourth aspect, in a second possible implementation manner of the fourth aspect, the first network layer is a tunnel layer, the second network layer is a network protocol layer, and the third network layer is a data link layer.

With reference to any possible implementation manner of the fourth aspect to the second possible implementation manner of the fourth aspect, in a third possible implementation manner of the fourth aspect, the characteristic information includes tenant information and a test information serial number.

With reference to any possible implementation manner of the fourth aspect to the third possible implementation manner of the fourth aspect, in a fourth possible implementation manner of the fourth aspect, the characteristic information is carried in a payload field of the diagnosis message.

With reference to the first possible implementation manner of the fourth aspect, in a fifth possible implementation manner of the fourth aspect, the device further includes:

a seventh sending module, configured to send, at the first network layer, cross-management domain notification information to the first network layer of the first network tunnel peer end, so that the first network tunnel peer end sends, at the first network layer, the diagnosis message to a first network layer of a second network tunnel source end.

With reference to the fifth possible implementation manner of the fourth aspect, in a sixth possible implementation manner of the fourth aspect, the device further includes:

an eighth sending module, configured to: send, at the second network layer, the cross-management domain notification information to the second network layer of the first network tunnel peer end, so that the first network tunnel peer end sends, at the second network layer, the diagnosis message to a second network layer of the second network tunnel source end;

and/or, send, by the first network tunnel source end, at the third network layer, the cross-management domain notification information to the third network layer of the first network tunnel peer end, so that the first network tunnel peer end sends, at the third network layer, the diagnosis message to a third network layer of the second network tunnel source end.

With reference to the fifth or sixth possible implementation manner of the fourth aspect, in a seventh possible implementation manner of the fourth aspect, the cross-management domain notification information is carried in a diagnosis message that is sent by each network layer of the first network tunnel source end to a corresponding network layer of the first network tunnel peer end.

In a fifth aspect, an embodiment of the present invention provides a network node device, including:

a receiving module, configured to receive, at a first network layer, a diagnosis message sent by a first network tunnel peer end, where the diagnosis message carries characteristic information;

a first sending module, configured to send, at the first network layer, the diagnosis message to a first network layer of a second network tunnel peer end and a second network layer of a second network tunnel source end, where the diagnosis message carries the characteristic information, so that the second network tunnel peer end reports, at the first network layer, a diagnosis result including the characteristic information to an instruction center; and a second sending module, configured to send, at the second network layer, the diagnosis message to a second network layer of the second network tunnel peer end, so that the first network tunnel peer end reports, at the second network layer, a diagnosis result including the characteristic information to the instruction center.

Embodiments of the present invention provide a method and an apparatus for network diagnosis processing. Characteristic information is carried in diagnosis information of various layers of various network tunnels to achieve association of layers and management domains of a diagnosis event by using the characteristic information, thereby resolving problems of low efficiency and low accuracy in a process of processing, analyzing and associating diagnosis results among various network layers or various network management domains.

BRIEF DESCRIPTION OF DRAWINGS

To describe the technical solutions in the embodiments of the present invention or in the prior art more clearly, the following briefly introduces the accompanying drawings required for describing the embodiments or the prior art. Apparently, the accompanying drawings in the following description show some embodiments of the present invention, and a person of ordinary skill in the art may still derive other drawings from these accompanying drawings without creative efforts.

DESCRIPTION OF EMBODIMENTS

To make the objectives, technical solutions, and advantages of the embodiments of the present invention clearer, the following clearly describes the technical solutions in the embodiments of the present invention with reference to the accompanying drawings in the embodiments of the present invention. Apparently, the described embodiments are a part rather than all of the embodiments of the present invention. All other embodiments obtained by a person of ordinary skill in the art based on the embodiments of the present invention without creative efforts shall fall within the protection scope of the present invention.

Figure 1:
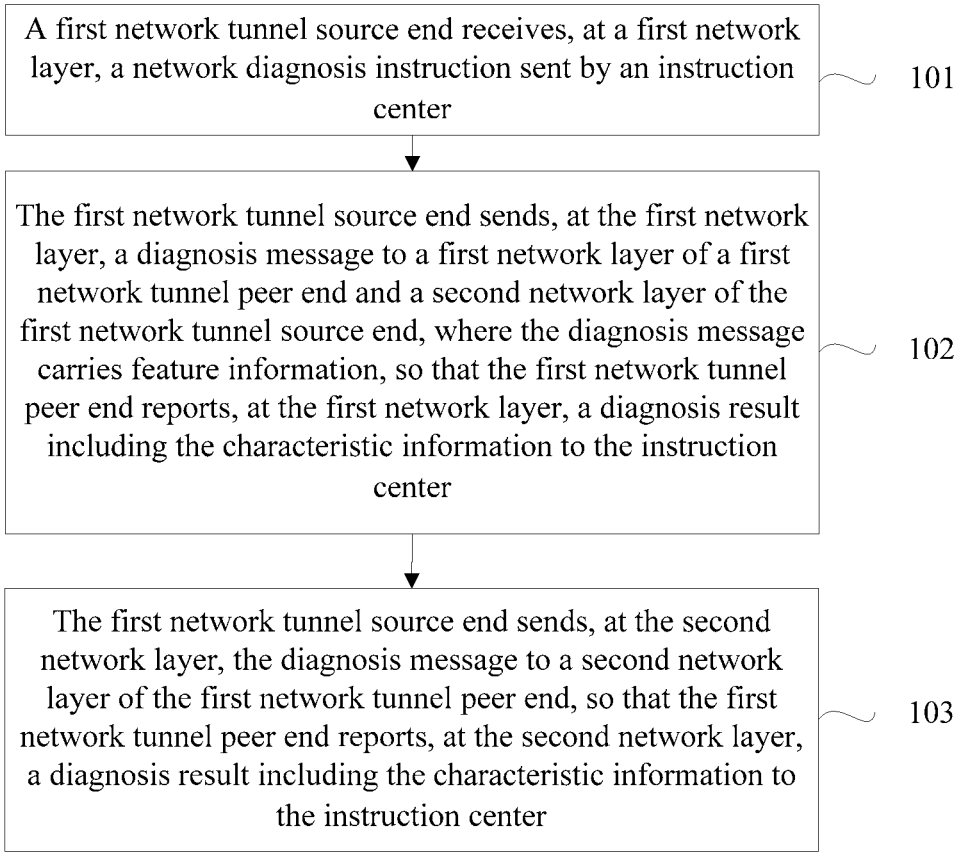
FIG. 1 is a flowchart of a first embodiment of a method for network diagnosis processing according to the present invention.

FIG. 1 is a flowchart of a first embodiment of a method for network diagnosis processing according to the present invention. As shown in FIG. 1, the method in this embodiment may include:

Step 101: A first network tunnel source end receives, at a first network layer, a network diagnosis instruction sent by an instruction center.

Specifically, when a service is interrupted or communication quality decreases in an Ethernet, a first network tunnel source end receives, at a first network layer, a network diagnosis instruction sent by an instruction center, to trigger the first network layer of the first network tunnel source end to initiate network diagnosis.

Step 102: The first network tunnel source end sends, at the first network layer, a diagnosis message to a first network layer of a first network tunnel peer end and a second network layer of the first network tunnel source end, where the diagnosis message carries characteristic information, so that the first network tunnel peer end reports, at the first network layer, a diagnosis result including the characteristic information to the instruction center.

Step 103: The first network tunnel source end sends, at the second network layer, the diagnosis message to a second network layer of the first network tunnel peer end, so that the first network tunnel peer end reports, at the second network layer, a diagnosis result including the characteristic information to the instruction center.

Specifically, after the first network tunnel source end receives, at the first network layer, the diagnosis instruction sent by the instruction center, the network tunnel source end sends, at the first network layer, a diagnosis message to the first network layer of the network tunnel peer end, and the diagnosis message carries characteristic information, where the characteristic information is generated by the first network tunnel source end according to the diagnosis instruction received, and may be tenant information, a test message serial number, and the like corresponding to the diagnosis instruction. The first network tunnel source end adds the characteristic information to the diagnosis message and sends it to the first network layer of the network tunnel peer end, so that the peer end adds the characteristic information to the diagnosis result when reporting, at the first network layer, the diagnosis result to the instruction center. In addition, the first network tunnel source end sends, at the first network layer, the diagnosis message to the second network layer of the network tunnel source end to trigger the second network layer to initiate network diagnosis, where the diagnosis message carries the characteristic information. After receiving the diagnosis message at the second network layer, the network tunnel source end sends the diagnosis message to the second network layer of the network tunnel peer end with the characteristic information carried, so that the network tunnel peer end adds the characteristic information to the diagnosis result when reporting, at the second network layer, the diagnosis result to the instruction center. The network tunnel peer end may report, at each network layer, a diagnosis result to the instruction center after receiving a diagnosis message sent by each corresponding network layer of the network source end, or upload all diagnosis results together after a period of time. This embodiment does not specifically limit manners in which network layers of the network tunnel peer end report diagnosis results to the instruction center.

There are two manners to trigger a third network layer of the first network tunnel source end to initiate network diagnosis:

Optionally, the following is further included:

the first network tunnel source end sends, at the second network layer, the diagnosis message to a third network layer of the first network tunnel source end; and the first network tunnel source end, sends at the third network layer, the diagnosis message to a third network layer of the first network tunnel peer end, so that the first network tunnel peer end reports, at the third network layer, a diagnosis result including the characteristic information to the instruction center.

Optionally, the following is further included:

the first network tunnel source end sends, at the first network layer, the diagnosis message to a third network layer of the first network tunnel source end; and the first network tunnel source end sends, at the third network layer, the diagnosis message to a third network layer of the first network tunnel peer end, so that the first network tunnel peer end reports, at the third network layer, a diagnosis result including the characteristic information to the instruction center.

Specifically, the first network tunnel source end sends, at the second network layer, the diagnosis message to the third network layer of the network tunnel source end, to trigger the third network layer of the network tunnel source end to initiate network diagnosis, where the diagnosis message carries the characteristic information, so that the third network layer of the network tunnel peer end adds the characteristic information to the diagnosis result when reporting the diagnosis result to the instruction center. Such a manner of triggering the third network layer is referred to as a multi-layer linkage diagnosis manner. Alternatively, the diagnosis message may be sent at the first network layer by the first network tunnel source end to the third network layer of the network tunnel source end, to trigger the third network layer of the network tunnel source end to initiate network diagnosis, where the diagnosis message also carries the characteristic information, so that the network tunnel peer end adds the characteristic information to the diagnosis result when reporting the diagnosis result to the instruction center at the third network layer.

Further, the first network layer is a tunnel layer, the second network layer is a network protocol layer, and the third network layer is a data link layer.

Further, the characteristic information includes tenant information and a test information serial number.

Further, the characteristic information is carried in a payload field of the diagnosis message.

Specifically, because a payload field in diagnosis information is arbitrarily filled and has no specific meaning, the characteristic information may be carried in the payload field of the diagnosis message.

Further, the following is further included:

the first network tunnel source end sends, at the first network layer, cross-management domain notification information to the first network layer of the first network tunnel peer end, so that the first network tunnel peer end sends, at the first network layer, the diagnosis message to a first network layer of a second network tunnel source end.

Further, the following is further included:

the first network tunnel source end sends, at the second network layer, the cross-management domain notification information to the second network layer of the first network tunnel peer end, so that the first network tunnel peer end sends, at the second network layer, the diagnosis message to a second network layer of the second network tunnel source end;

and/or, the first network tunnel source end sends, at the third network layer, the cross-management domain notification information to the third network layer of the first network tunnel peer end, so that the first network tunnel peer end sends, at the third network layer, the diagnosis message to a third network layer of the second network tunnel source end.

Further, the cross-management domain notification information is carried in a diagnosis message that is sent by each network layer of the first network tunnel source end to a corresponding network layer of the first network tunnel peer end.

Figure 2:
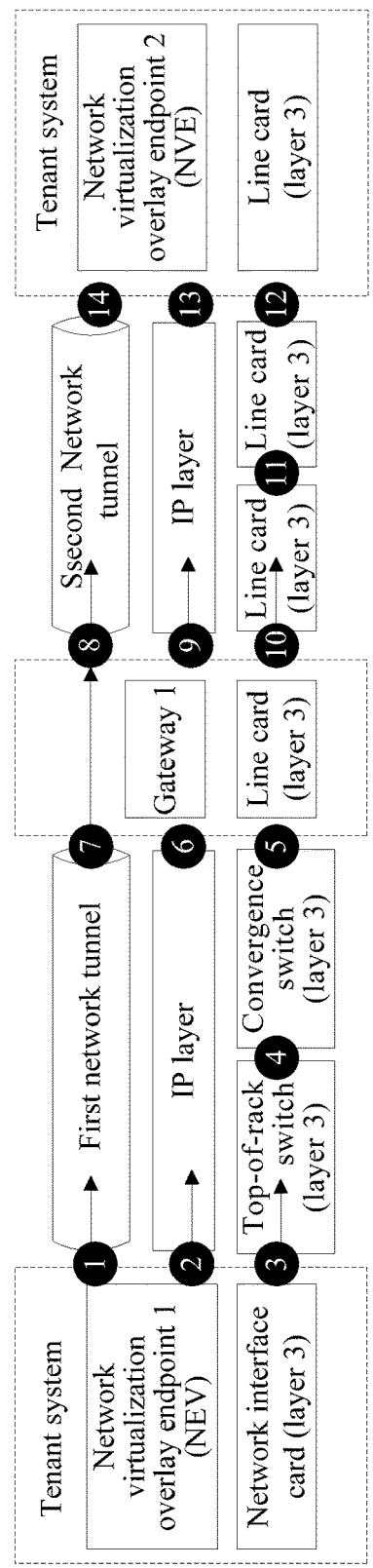
FIG. 2 is a schematic diagram of network diagnosis.

Specifically, cross-management domain network diagnosis may be implemented by supplementing an Ethernet OAM protocol. For example, in a virtual extensible local area network (VXLAN), it may be agreed that, when an $M^{th}$ bit of a VXLAN header is set to "1", crossing of a management domain is performed, that is, a first network layer of a first network tunnel source end sends cross-management domain notification information to a first network layer of a first network tunnel peer end, so that the first network layer of the first network tunnel peer end sends the diagnosis message to a first network layer of a second network tunnel source end. Similarly, when the first network layer of the first network tunnel peer end sends the cross-management domain notification information to the first network layer of the network tunnel peer end, a second network layer or a third network layer of the first network tunnel source end may also send the cross-management domain notification information to a second network layer or a third network layer of the first network tunnel peer end. The cross-management domain notification information is carried in a diagnosis message that is sent by each network layer of the first network tunnel source end to a corresponding network layer of the first network tunnel peer end. FIG. 2 is a schematic diagram of network diagnosis. As shown in FIG. 2, point 1 corresponds to a first network layer of a first network tunnel source end; point 2 corresponds to a second network layer of the first tunnel source end; point 3 corresponds to a third network layer of the network tunnel source end; point 7 corresponds to a peer end of the first network layer of the first network tunnel source end; point 6 corresponds to a peer end of the second network layer of the first network tunnel source end; point 5 corresponds to a peer end of the third network layer of the first network tunnel source end; point 8 corresponds to a first network layer of a second network tunnel source end; point 9 corresponds to a second network layer of the second network tunnel source end; point 10 corresponds to a third network layer of a second network tunnel; point 12 corresponds to a peer end of the third network layer of the second network tunnel; point 13 corresponds to a peer end of a second network layer of the second network tunnel; and point 14 corresponds to a peer end of a first network layer of the second network tunnel. Point 1 receives a network diagnosis instruction issued by an instruction center and sends a diagnosis message to point 7 and point 2, where the diagnosis message carries characteristic information, and point 2 sends the diagnosis message to point 6. Network diagnosis with respect to point 3 may be triggered in two ways: Point 1 or point 2 sends a diagnosis message to point 3, and point 3 sends the diagnosis message to point 5. The foregoing process implements network diagnosis among network layers of a first network tunnel. A specific cross-domain process is as follows: Point 1 sends cross-management domain notification information to point 7, and point 7 sends the diagnosis message to point 8. For other content, the network diagnosis process for the second network tunnel is similar to the network diagnosis process for the first network tunnel, and details are not described herein.

In this embodiment, characteristic information is carried in diagnosis information of various layers of various network tunnels to achieve association of layers and management domains of a diagnosis event by using the characteristic information, thereby resolving problems of low efficiency and low accuracy in a process of processing, analyzing and associating diagnosis results among various network layers or various network management domains.

Figure 3:
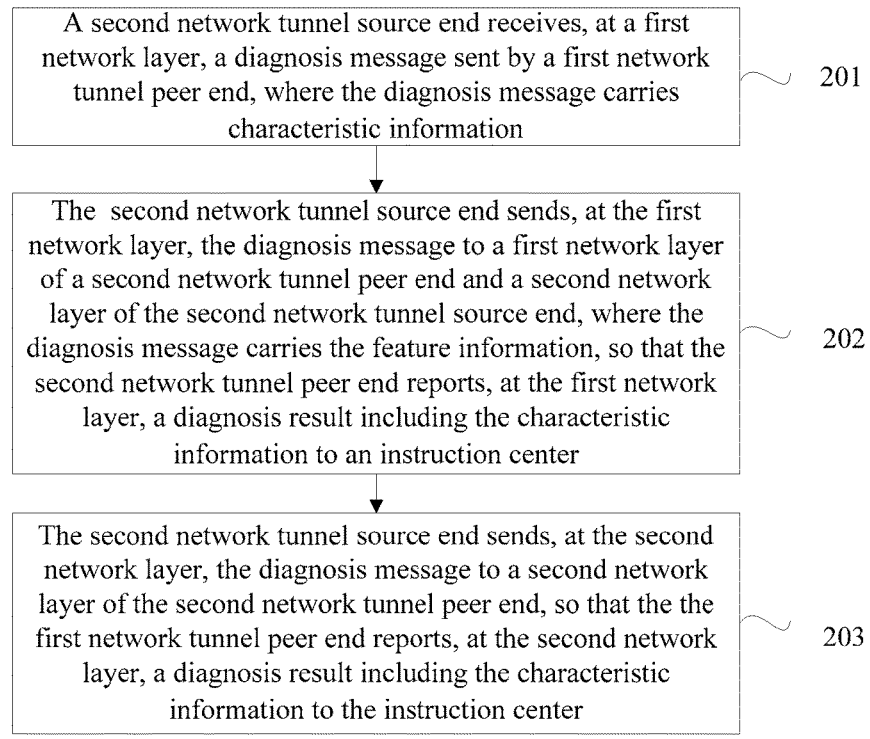
FIG. 3 is a flowchart of a second embodiment of a method for network diagnosis processing according to the present invention.

FIG. 3 is a flowchart of a second embodiment of a network diagnosis processing method according to the present invention. As shown in FIG. 3, the method in this embodiment may include:

Step 201: A second network tunnel source end receives, at a first network layer, a diagnosis message sent by a first network tunnel peer end, where the diagnosis message carries characteristic information.

Step 202: The second network tunnel source end sends, at the first network layer, the diagnosis message to a first network layer of a second network tunnel peer end and a second network layer of the second network tunnel source end, where the diagnosis message carries the characteristic information, so that the second network tunnel peer end reports, at the first network layer, a diagnosis result including the characteristic information to an instruction center.

Step 203: The second network tunnel source end sends, at the second network layer, the diagnosis message to a second network layer of the second network tunnel peer end, so that the first network tunnel peer end reports, at the second network layer, a diagnosis result including the characteristic information to the instruction center.

Specifically, the second network tunnel source end receives, at the first network layer, a diagnosis message sent by the first network tunnel peer end, to trigger the first network layer of the second network tunnel source end to initiate network diagnosis. After the second network tunnel source end receives, at the first network layer, the diagnosis message sent by the first network tunnel peer end, the first network layer of the network tunnel source end sends the diagnosis message to the first network layer of the network tunnel peer end, where the diagnosis message carries characteristic information. The second network tunnel source end adds the characteristic information to the diagnosis message and sends it to the first network layer of the network tunnel peer end, so that the first network layer of the peer end adds the characteristic information to a diagnosis result when reporting the diagnosis result to the instruction center. In addition, the first network layer of the second network tunnel source end sends the diagnosis message to the second network layer of the network tunnel source end, to trigger the second network layer to initiate network diagnosis, where the diagnosis message carries the characteristic information. After receiving the diagnosis message, the second network layer of the network tunnel source end sends the diagnosis message carrying the characteristic information to the second network layer of the network tunnel peer end, so that the second network layer of the network tunnel peer end adds the characteristic information to a diagnosis result when reporting the diagnosis result to the instruction center.

There are two manners to trigger a third network layer of the second network tunnel source end to initiate network diagnosis:

Optionally, the following is further included:

the second network tunnel source end sends, at the second network layer, the diagnosis message to the third network layer of the second network tunnel source end; and the second network tunnel source end sends, at the third network layer, the diagnosis message to a third network layer of the second network tunnel peer end, so that the second network tunnel peer end reports, at the third network layer, a diagnosis result including the characteristic information to the instruction center.

Optionally, the following is further included:

the second network tunnel source end sends, at the first network layer, the diagnosis message to the third network layer of the second network tunnel source end; and the second network tunnel source end sends, at the third network layer, the diagnosis message to a third network layer of the second network tunnel peer end, so that the second network tunnel peer end reports, at the third network layer, a diagnosis result including the characteristic information to the instruction center.

Specifically, the second network tunnel source end sends, at the second network layer, the diagnosis message to the third network layer of the network tunnel source end, to trigger the third network layer of the network tunnel source end to initiate network diagnosis, where the diagnosis message carries the characteristic information, so that the third network layer of the network tunnel peer end adds the characteristic information to a diagnosis result when reporting the diagnosis result to the instruction center. Such a manner of triggering the third network layer is referred to as a multi-layer linkage diagnosis manner. Alternatively, the diagnosis message may be sent to the third network layer of the network tunnel source end by the first network layer of the second network tunnel source end, to trigger the third network layer of the network tunnel source end to initiate network diagnosis, where the diagnosis message also carries the characteristic information, so that the third network layer of the network tunnel peer end adds the characteristic information to a diagnosis result when reporting the diagnosis result to the instruction center.

Further, the first network layer is a tunnel layer, the second network layer is a network protocol layer, and the third network layer is a data link layer.

Further, the characteristic information includes tenant information and a test information serial number.

Further, the characteristic information is carried in a payload field of the diagnosis message.

Specifically, because a payload field of diagnosis information is arbitrarily filled and has not specific meaning, the characteristic information may be carried in the payload field of the diagnosis message.

Further, the following is further included:

the second network tunnel source end sends, at the first network layer, cross-management domain notification information to a first network layer of a second network tunnel peer end, so that the second network tunnel peer end sends, at the first network layer, the diagnosis message to a first network layer of a third network tunnel source end.

Further, the following is further included:

the second network tunnel source end sends, at the second network layer, cross-management domain notification information to a second network layer of the second network tunnel peer end, so that the second network tunnel peer end sends, at the second network layer, the diagnosis message to a second network layer of the third network tunnel source end;

and/or, the second network tunnel source end sends, at the third network layer, the cross-management domain notification information to a third network layer of the second network tunnel peer end, so that the second network tunnel peer end sends, at the third network layer, the diagnosis message to a third network layer of the third network tunnel source end.

Further, the cross-management domain notification information is carried in a diagnosis message that is sent by each network layer of the second network tunnel source end to a corresponding network layer of the second network tunnel peer end.

Specifically, cross-management domain network diagnosis may be implemented by supplementing an Ethernet OAM protocol. For example, in a virtual extensible local area network (VXLAN), it may be agreed that, when an $M^{th}$ bit of a VXLAN header is set to "1", crossing of a management domain is performed, that is, a first network layer of a first network tunnel source end sends cross-management domain notification information to a first network layer of a first network tunnel peer end, so that the first network layer of the first network tunnel peer end sends the diagnosis message to a first network layer of a second network tunnel source end. Similarly, when the first network layer of the first network tunnel peer end sends the cross-management domain notification information to the first network layer of the network tunnel peer end, a second network layer or a third network layer of the first network tunnel source end may also send the cross-management domain notification information to a second network layer or a third network layer of the first network tunnel peer end. The cross-management domain notification information is carried in a diagnosis message that is sent by each network layer of the first network tunnel source end to a corresponding network layer of the first network tunnel peer end.

In this embodiment, characteristic information is carried in diagnosis information of various layers of various network tunnels to achieve association of layers and management domains of a diagnosis event by using the characteristic information, thereby resolving problems of low efficiency and low accuracy in a process of processing, analyzing and associating diagnosis results among various network layers or various network management domains.

Figure 4:
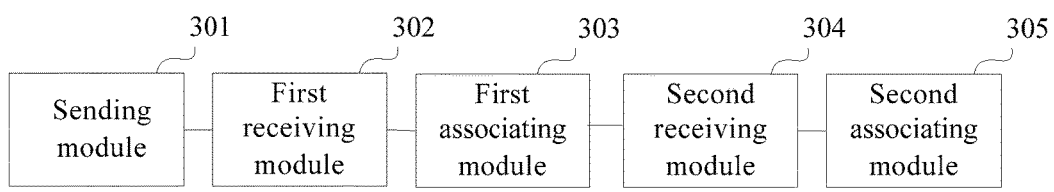
FIG. 4 is a schematic structural diagram of a first embodiment of an instruction center according to the present invention.

FIG. 4 is a schematic structural diagram of a first embodiment of an instruction center according to the present invention. As shown in FIG. 4, the instruction center in this embodiment may include:

a sending module 301, configured to send a network diagnosis instruction to a first network layer of a first network tunnel source end, so that the first network layer sends a diagnosis message to a first network layer of a first network tunnel peer end and a second network layer of the first network tunnel source end, and the second network layer of the first network tunnel source end sends the diagnosis message to a second network layer of the first network tunnel peer end, where the diagnosis message includes characteristic information;

a first receiving module 302, configured to receive diagnosis results that are reported by the first network layer, the second network layer, and a third network layer of the first network tunnel peer end according to the diagnosis message, where the diagnosis result includes the characteristic information;

a first associating module 303, configured to perform, according to the characteristic information, an association analysis on the diagnosis results that are reported by the first network layer, the second network layer, and the third network layer;

a second receiving module 304, configured to receive diagnosis results that are reported by a first network layer, a second network layer, and a third network layer of a second network tunnel peer end according to the diagnosis message, where the diagnosis result includes the characteristic information; and a second associating module 305, configured to perform, according to the characteristic information, an association analysis on the diagnosis results that are reported by the first network layer, the second network layer, and the third network layer of the first network tunnel peer end and by the first network layer, the second network layer, and the third network layer of the second network tunnel peer end.

Specifically, the first receiving module receives the diagnosis results that include the characteristic information and are reported by the first network layer, the second network layer, and the third network layer of the first network tunnel peer end, and the first associating module associates, for analysis according to the characteristic information, the diagnosis results that are reported by the first network layer, the second network layer, and the third network layer of the network tunnel, so as to find a fault point of a first network. The second receiving module receives the diagnosis results reported by the first network layer, the second network layer, and the third network layer corresponding to the second network tunnel peer end, and the second associating module associates, for analysis according to the characteristic information included in the diagnosis results, all diagnosis results, so as to find a fault point of a network.

In this embodiment, the instruction center sends a network diagnosis instruction to a first network layer of a first network tunnel source end by using a sending module, and receives diagnosis results that are reported by first network layers, second network layers and third network layers of a first network tunnel peer end and a second network tunnel peer end according to a diagnosis message, where the diagnosis result includes characteristic information, thereby achieving association of various layers and various management domains of a diagnosis event by using the characteristic information, and resolving problems of low efficiency and low accuracy in a process of processing, analyzing and associating diagnosis results among various network layers or various network management domains.

Figure 5:
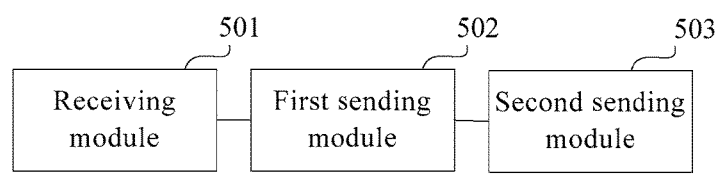
FIG. 5 is a schematic structural diagram of a first embodiment of a network node device according to the present invention.

FIG. 5 is a schematic structural diagram of a first embodiment of a network node device according to the present invention. As shown in FIG. 5, the node device in this embodiment may include:

a receiving module 501, configured to receive, at a first network layer, a network diagnosis instruction sent by an instruction center;

a first sending module 502, configured to send, at the first network layer, a diagnosis message to a first network layer of a first network tunnel peer end and a second network layer of the first network tunnel source end, where the diagnosis message carries characteristic information, so that the first network tunnel peer end reports, at the first network layer, a diagnosis result including the characteristic information to the instruction center; and a second sending module 503, configured to send, at the second network layer, the diagnosis message to a second network layer of the first network tunnel peer end, so that the first network tunnel peer end reports, at the second network layer, a diagnosis result including the characteristic information to the instruction center.

Further, the first network layer is a tunnel layer, the second network layer is a network protocol layer, and the third network layer is a data link layer.

Further, the characteristic information includes tenant information and a test information serial number.

Further, the characteristic information is carried in a payload field of the diagnosis information.

The device in this embodiment can be configured to perform the technical solution of the method embodiment shown in FIG. 1. Implementation principles and technical effects thereof are similar, and details are not described herein.

Figure 6:
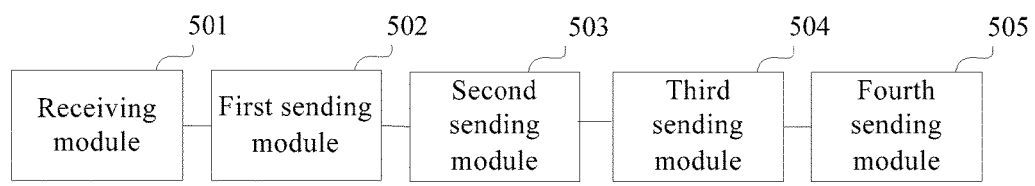
FIG. 6 is a schematic structural diagram of a second embodiment of a network node device according to the present invention.

FIG. 6 is a schematic structural diagram of a second embodiment of a network node device according to the present invention. As shown in FIG. 6, based on the device structure shown in FIG. 5, the device in this embodiment may further include:

a third sending module 504, configured to send, at the second network layer, the diagnosis message to a third network layer of the first network tunnel source end; and a fourth sending module 505, configured to send, at the third network layer, the diagnosis message to a third network layer of the first network tunnel peer end, so that the first network tunnel peer end reports, at the third network layer, a diagnosis result including the characteristic information to the instruction center.

The device in this embodiment can be configured to perform the technical solution of the method embodiment shown in FIG. 1. Implementation principles and technical effects thereof are similar, and details are not described herein.

Figure 7:
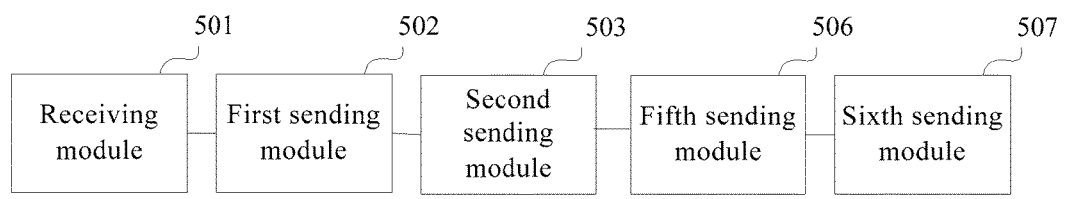
FIG. 7 is a schematic structural diagram of a third embodiment of a network node device according to the present invention.

FIG. 7 is a schematic structural diagram of a third embodiment of a network node device according to the present invention. As shown in FIG. 7, based on the device structure shown in FIG. 5, the device in this embodiment may further include:

a fifth sending module 506, configured to send, at the first network layer, the diagnosis message to a third network layer of the first network tunnel source end; and a sixth sending module 507, configured to send, at the third network layer, the diagnosis message to a third network layer of the first network tunnel peer end, so that the first network tunnel peer end reports, at the third network layer, a diagnosis result including the characteristic information to the instruction center.

The device in this embodiment can be configured to perform the technical solution of the method embodiment shown in FIG. 1. Implementation principles and technical effects thereof are similar, and details are not described herein.

Figure 8A:
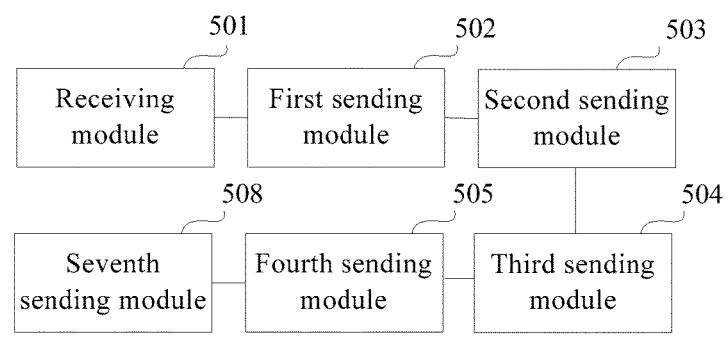
FIG. 8a is a schematic structural diagram of a fourth embodiment of a network node device according to the present invention.

FIG. 8a is a schematic structural diagram of a fourth embodiment of a network node device according to the present invention. As shown in FIG. 8a, based on the device structure shown in FIG. 6, the device in this embodiment may further include:

a seventh sending module 508, configured to send, at the first network layer, cross-management domain notification information to the first network layer of the first network tunnel peer end, so that the first network tunnel peer end sends, at the first network layer, the diagnosis message to a first network layer of a second network tunnel source end.

The device in this embodiment can be configured to perform the technical solution of the method embodiment shown in FIG. 1. Implementation principles and technical effects thereof are similar, and details are not described herein.

Figure 8B:
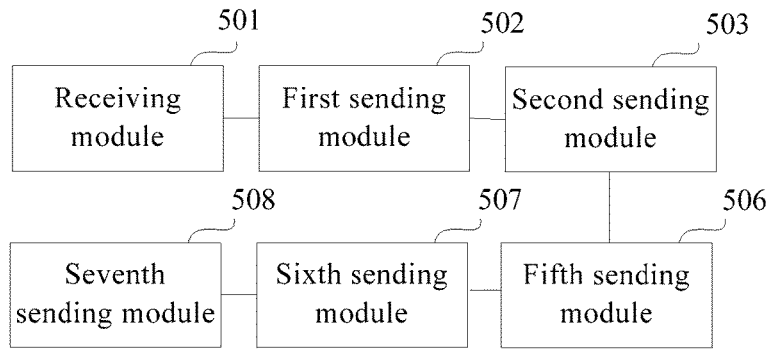
FIG. 8b is a schematic structural diagram of a fifth embodiment of a network node device according to the present invention.

FIG. 8b is a schematic structural diagram of a fifth embodiment of a network node device according to the present invention. As shown in FIG. 8b, based on the device structure shown in FIG. 7, the device in this embodiment may further include:

a seventh sending module 508, configured to send, at the first network layer, cross-management domain notification information to the first network layer of the first network tunnel peer end, so that the first network tunnel peer end sends, at the first network layer, the diagnosis message to a first network layer of a second network tunnel source end.

The device in this embodiment can be configured to perform the technical solution of the method embodiment shown in FIG. 1. Implementation principles and technical effects thereof are similar, and details are not described herein.

Figure 9A:
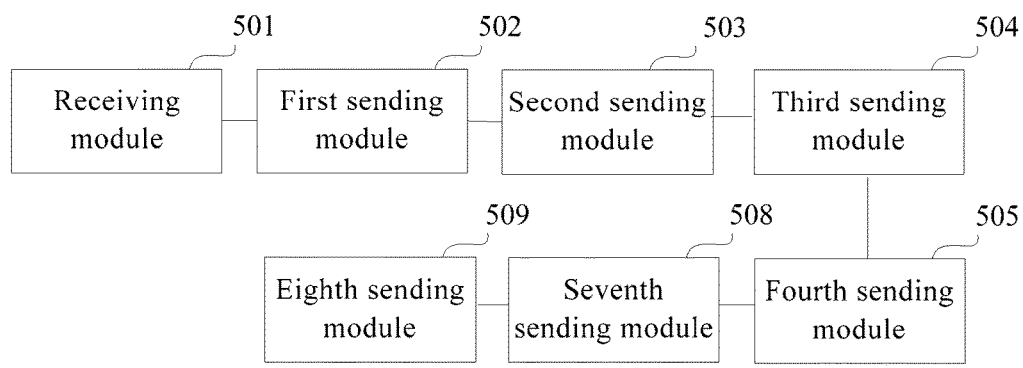
FIG. 9a is a schematic structural diagram of a sixth embodiment of a network node device according to the present invention.

FIG. 9a is a schematic structural diagram of a sixth embodiment of a network node device according to the present invention. As shown in FIG. 9a, based on the device structure shown in FIG. 8a, the device in this embodiment may further include:

an eighth sending module 509, configured to: send, at the second network layer, the cross-management domain notification information to the second network layer of the first network tunnel peer end, so that the first network tunnel peer end sends, at the second network layer, the diagnosis message to a second network layer of the second network tunnel source end;

and/or, send, at the third network layer, the cross-management domain notification information to the third network layer of the first network tunnel peer end, so that the first network tunnel peer end sends, at the third network layer, the diagnosis message to a third network layer of the second network tunnel source end.

The device in this embodiment can be configured to perform the technical solution of the method embodiment shown in FIG. 1. Implementation principles and technical effects thereof are similar, and details are not described herein.

Figure 9B:
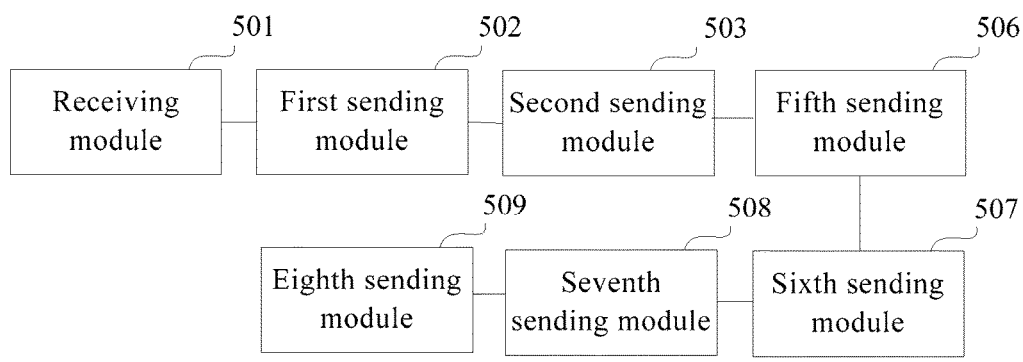
FIG. 9b is a schematic structural diagram of a seventh embodiment of a network node device according to the present invention.

FIG. 9b is a schematic structural diagram of a seventh embodiment of a network node device according to the present invention. As shown in FIG. 9b, based on the device structure shown in FIG. 8b, the device in this embodiment may, further include:

an eighth sending module 509, configured to: send, at the second network layer, the cross-management domain notification information to the second network layer of the first network tunnel peer end, so that the first network tunnel peer end sends, at the second network layer, the diagnosis message to a second network layer of the second network tunnel source end;

and/or, send, at the third network layer, the cross-management domain notification information to the third network layer of the first network tunnel peer end, so that the first network tunnel peer end sends, at the third network layer, the diagnosis message to a third network layer of the second network tunnel source end.

The device in this embodiment can be configured to perform the technical solution of the method embodiment shown in FIG. 1. Implementation principles and technical effects thereof are similar, and details are not described herein.

Figure 10:
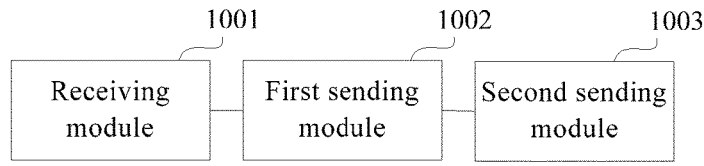
FIG. 10 is a schematic structural diagram of an eighth embodiment of a network node device according to the present invention.

FIG. 10 is a schematic structural diagram of an eighth embodiment of a network node device according to the present invention. As shown in FIG. 10, the device in this embodiment may include:

a receiving module 1001, configured to receive, at a first network layer, a diagnosis message sent by a first network tunnel peer end, where the diagnosis message includes characteristic information;

a first sending module 1002, configured to send, at the first network layer, the diagnosis message to a first network layer of a second network tunnel peer end and a second network layer of a second network tunnel source end, where the diagnosis message carries the characteristic information, so that the second network tunnel peer end reports, at the first network layer, a diagnosis result including the characteristic information to an instruction center; and a second sending module 1003, configured to send, at the second network layer, the diagnosis message to a second network layer of the second network tunnel peer end, so that the second network tunnel peer end reports, at the second network layer, a diagnosis result including the characteristic information to the instruction center.

Further, the first network layer is a tunnel layer, the second network layer is a network protocol layer, and the third network layer is a data link layer.

Further, the characteristic information includes tenant information and a test information serial number.

Further, the characteristic information is carried in a payload field of the diagnosis information.

The device in this embodiment can be configured to perform the technical solution of the method embodiment shown in FIG. 3. Implementation principles and technical effects thereof are similar, and details are not described herein.

Figure 11:
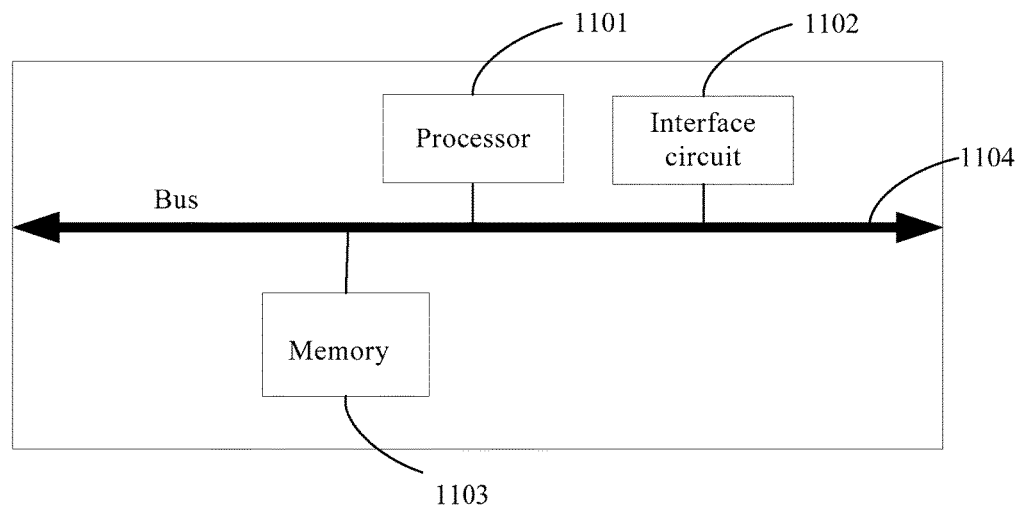
FIG. 11 is a schematic structural diagram of a ninth embodiment of a network node device according to the present invention.

FIG. 11 is a schematic structural diagram of a ninth embodiment of a network node device according to the present invention. As shown in FIG. 11, the network device in this embodiment may include a processor 1101 and an interface circuit 1102. The figure further shows a memory 1103 and a bus 1104, where the processor 1101, the interface circuit 1102, and the memory 1103 are connected through the bus 1104 to implement communication between each other.

The bus 1104 may be, for example, an industry standard architecture (ISA) bus, a peripheral component interconnect (PCI) bus, an inter-integrated circuit (I2C) bus, or the like. The bus 1104 may be divided into an address bus, a data bus, a control bus, and the like. For convenience of illustration, the bus is represented by a thick line in FIG. 11, which does not indicate that there is only one bus or only one type of bus.

The memory 1103 is configured to store executable program code, where the program code includes a computer operation instruction. The memory 1103 may be a volatile memory such as a random-access memory (RAM), or a non-volatile memory (NVM) such as a read-only memory (ROM), a flash memory, a hard disk drive (HDD), or a solid-state drive (SSD).

The processor 1101 may be a central processing unit (CPU).

The processor 1101 may call operation instructions or program code stored in the memory 1103 to perform a virtual local area network interface processing method provided in this embodiment of the present invention, where the method includes:

receiving, by the processor 1101 through the interface circuit 1102 a network diagnosis instruction sent by an instruction center;

sending, by the processor 1101, a diagnosis message to a first network layer of a first network tunnel peer end and a second network layer of a first network tunnel source end through the interface circuit 1102, where the diagnosis message carries characteristic information, so that the first network tunnel peer end reports, at the first network layer, a diagnosis result including the characteristic information to the instruction center; and sending, by the processor 1101, the diagnosis message to the second network layer of the first network tunnel peer end through the interface circuit 1102, so that the first network tunnel peer end reports, at the second network layer, a diagnosis result including the characteristic information to the instruction center.

The processor 1101 sends the diagnosis message to a third network layer of the first network tunnel source end through the interface circuit 1102; and the processor 1101 sends the diagnosis message to a third network layer of the first network tunnel peer end through the interface circuit 1102, so that the first network tunnel peer end reports, at the third network layer, a diagnosis result including the characteristic information to the instruction center.

The processor 1101 sends the diagnosis message to a third network layer of the first network tunnel source end through the interface circuit 1102; and the processor 1101 sends the diagnosis message to a third network layer of the first network tunnel peer end through the interface circuit 1102, so that the first network tunnel peer end reports, at the third network layer, a diagnosis result including the characteristic information to the instruction center.

The processor 1101 sends cross-management domain notification information to the first network layer of the first network tunnel peer end through the interface circuit 1102, so that the first network tunnel peer end sends, at the first network layer, the diagnosis message to a first network layer of a second network tunnel source end.

The processor 1101 sends the cross-management domain notification information to the second network layer of the first network tunnel peer end through the interface circuit 1102, so that the first network tunnel peer end sends, at the second network layer, the diagnosis message to a second network layer of the second network tunnel source end;

and/or, the processor 1101 sends the cross-management domain notification information to the third network layer of the first network tunnel peer end through the interface circuit 1102, so that the first network tunnel peer end sends, at the third network layer, the diagnosis message to a third network layer of the second network tunnel source end.

Figure 12:
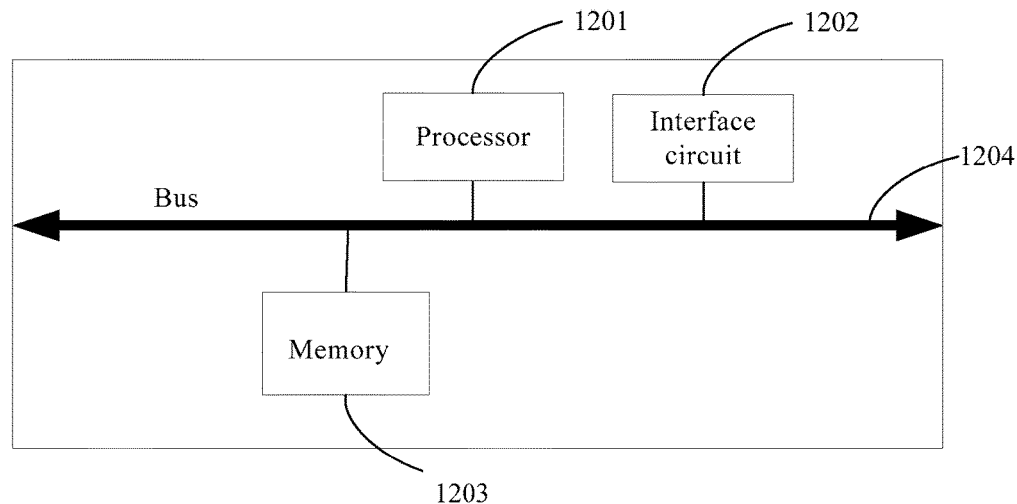
FIG. 12 is a schematic structural diagram of a tenth embodiment of a network node device according to the present invention.

FIG. 12 is a schematic structural diagram of a tenth embodiment of a network node device according to the present invention. As shown in FIG. 12, the network device in this embodiment may include a processor 1201 and an interface circuit 1202. The figure further shows a memory 1203 and a bus 1204, where the processor 1201, the interface circuit 1202, and the memory 1203 are connected through the bus 1204 to implement communication between each other.

The bus 1204 may be an industry standard architecture (ISA) bus, a peripheral component interconnect (PCI) bus, an inter-integrated circuit (I2C) bus, or the like. The bus 1204 may be divided into an address bus, a data bus, a control bus, and the like. For convenience of illustration, the bus is represented by a thick line in FIG. 12, which does not indicate that there is only one bus or only one type of bus.

The memory 1203 is configured to store executable program code, where the program code includes a computer operation instruction. The memory 1203 may be a volatile memory such as a random-access memory (RAM), or a non-volatile memory (NVM) such as a read-only memory (ROM), a flash memory, a hard disk drive (HDD), or a solid-state drive (SSD).

The processor 1201 may be a central processing unit (CPU).

The processor 1201 may call operation instructions or program code stored in memory 1203 to perform a virtual local area network interface processing method provided in this embodiment of the present invention, where the method includes receiving, by a processor 1201 through an interface circuit 1202, a diagnosis message sent by a first network tunnel peer end, where the diagnosis message includes characteristic information;

sending, by the processor 1201 through the interface circuit 1202, the diagnosis message to a first network layer of a second network tunnel peer end and a second network layer of a second network tunnel source end, where the diagnosis message carries the characteristic information, so that the second network tunnel peer end reports, at the first network layer, a diagnosis result including the characteristic information to an instruction center; and sends, by the processor 1201 through the interface circuit 1202, the diagnosis message to a second network layer of the second network tunnel peer end, so that the first network tunnel peer end reports, at the second network layer, a diagnosis result including the characteristic information to the instruction center.

The processor 1201 sends the diagnosis message to a third network layer of the second network tunnel source end through the interface circuit 1202; and the processor 1201 sends the diagnosis message to a third network layer of the second network tunnel peer end through the interface circuit 1202, so that the second network tunnel peer end reports, at the third network layer, the diagnosis result including the characteristic information to the instruction center.

The processor 1201 sends the diagnosis message to a third network layer of the second network tunnel source end through the interface circuit 1202; and the processor 1201 sends the diagnosis message to a third network layer of the second network tunnel peer end through the interface circuit 1202, so that the second network tunnel peer end reports, at the third network layer, the diagnosis result including the characteristic information to the instruction center.

The processor 1201 sends cross-management domain notification information to a first network layer of a second network tunnel peer end through the interface circuit 1202, so that the second network tunnel peer end sends, at the first network layer, the diagnosis message to a first network layer of a third network tunnel source end.

The processor 1201 sends the cross-management domain notification information to the second network layer of the second network tunnel peer end through the interface circuit 1202, so that the second network tunnel peer end sends, at the second network layer, the diagnosis message to a second network layer of the third network tunnel source end;

and/or, the processor 1201 sends the cross-management domain notification information to the third network layer of the second network tunnel peer end through the interface circuit 1202, so that the second network tunnel peer end sends, at the third network layer, the diagnosis message to a third network layer of the third network tunnel source end.

Figure 13:
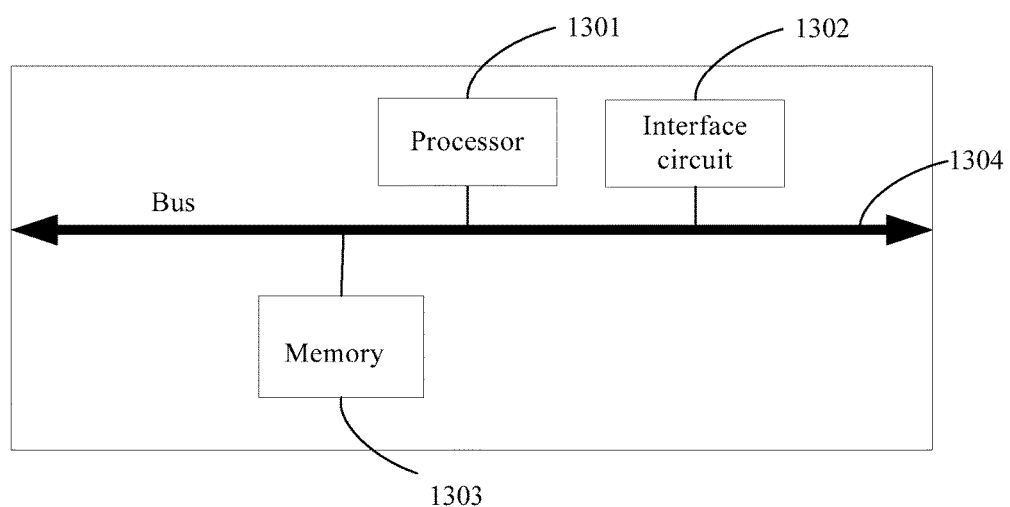
FIG. 13 is a schematic structural diagram of an eleventh embodiment of a network node device according to the present invention.

FIG. 13 is a schematic structural diagram of an eleventh embodiment of a network node device according to the present invention. As shown in FIG. 13, the network device in this embodiment may include a processor 1301 and an interface circuit 1302. The figure further shows a memory 1303 and a bus 1304, where the processor 1301, the interface circuit 1302, and the memory 1303 are connected through the bus 1304 to implement communication between each other.

The bus 1304 may be an industry standard architecture (ISA) bus, a peripheral component interconnect (PCI) bus or an inter-integrated circuit (I2C) bus. The bus 1304 may be divided into an address bus, a data bus, a control bus, and the like. For convenience of illustration, the bus is represented by a thick line in FIG. 13, which does not indicate that there is only one bus or only one type of bus.

The memory 1303 is configured to store executable program code, where the program code includes a computer operation instruction. The memory 1303 may be a volatile memory such as a random-access memory (RAM), a non-volatile memory (NVM) such as a read-only memory (ROM), a flash memory, a hard disk drive (HDD), or a solid-state drive (SSD).

The processor 1301 may be a central processing unit (CPU).

The processor 1301 may call operation instructions or program code stored in the memory 1303 to perform a virtual local area network interface processing method provided in this embodiment of the present invention, where the method includes:

sends, by the processor 1301, a network diagnosis instruction to a first network layer of a first network tunnel source end through an interface circuit 1302, so that the first network layer sends a diagnosis message to a first network layer of a first network tunnel peer end and a second network layer of the first network tunnel source end, and the first network tunnel source end sends, at the second network layer, the diagnosis message to a second network layer of the first network tunnel peer end, where the diagnosis message includes characteristic information;

receiving, by the processor 1301 through the interface circuit 1302, diagnosis results that are reported by the first network layer and the second network layer of the first network tunnel peer end according to the diagnosis message, where the diagnosis result includes the characteristic information; and performing, by the processor 1301 according to the characteristic information, an association analysis on the diagnosis results reported by the first network layer and the second network layer.

The processor 1301 receives, through the interface circuit 1302, a diagnosis result reported by a third network layer of the first network tunnel peer end; and the processor 1301 receives, through the interface circuit 1302, diagnosis results that are reported by a first network layer, a second network layer, and a third network layer of a second network tunnel peer end according to the diagnosis message, where the diagnosis result includes the characteristic information.

A person of ordinary skill in the art may understand that all or a part of the steps of the method embodiments may be implemented by a program instructing relevant hardware. The program may be stored in a computer readable storage medium. When the program runs, the steps of the method embodiments are performed. The foregoing storage medium includes: any medium that can store program code, such as a ROM, a RAM, a magnetic disk, or an optical disc.

Finally, it should be noted that the foregoing embodiments are merely intended for describing the technical solutions of the present invention, but not for limiting the present invention. Although the present invention is described in detail with reference to the foregoing embodiments, persons of ordinary skill in the art should understand that they may still make modifications to the technical solutions described in the foregoing embodiments or make equivalent replacements to some or all technical features thereof, without departing from the scope of the technical solutions of the embodiments of the present invention.

What is claimed is:

1. A method for network diagnosis processing, comprising:

receiving, by a first network tunnel source end, at a first network layer of the first network tunnel source end, a network diagnosis instruction sent by an instruction center;

sending, by the first network tunnel source end, at the first network layer of the first network tunnel source end, a diagnosis message to a first network layer of a first network tunnel peer end and a second network layer of the first network tunnel source end, wherein the diagnosis message carries characteristic information, so that the first network tunnel peer end reports, at the first network layer of the first network tunnel peer end, a diagnosis result comprising the characteristic information to the instruction center;

sending, by the first network tunnel source end, at the second network layer of the first network tunnel source end, the diagnosis message to a second network layer of the first network tunnel peer end, so that the first network tunnel peer end reports, at the second network layer of the first network tunnel peer end, a diagnosis result comprising the characteristic information to the instruction center; and associating, using the characteristic information, the diagnosis results reported by the first network tunnel peer end at the first network layer of the first network tunnel peer end and at the second network layer of the first network tunnel peer end.

2. The method according to claim 1, further comprising:

sending, by the first network tunnel source end, at the second network layer of the first network tunnel source end, the diagnosis message to a third network layer of the first network tunnel source end; and sending, by the first network tunnel source end, at the third network layer of the first network tunnel source end, the diagnosis message to a third network layer of the first network tunnel peer end, so that the first network tunnel peer end reports, at the third network layer of the first network tunnel peer end, a diagnosis result comprising the characteristic information to the instruction center.

3. The method according to claim 2, wherein the first network layer is a tunnel layer, the second network layer is a network protocol layer, and the third network layer is a data link layer.

4. The method according to claim 2, further comprising:

sending, by the first network tunnel source end, at the first network layer of the first network tunnel source end, cross-management domain notification information to the first network layer of the first network tunnel peer end, so that the first network tunnel peer end sends, at the first network layer of the first network tunnel peer end, the diagnosis message to a first network layer of a second network tunnel source end.

5. The method according to claim 4, further comprising:

sending, by the first network tunnel source end, at the second network layer of the first network tunnel source end, the cross-management domain notification information to the second network layer of the first network tunnel peer end, so that the first network tunnel peer end sends, at the second network layer of the first network tunnel peer end, the diagnosis message to a second network layer of the second network tunnel source end.

6. The method according to claim 4, further comprising:
sending, by the first network tunnel source end, at the third network layer of the first network tunnel source end, the cross-management domain notification information to the third network layer of the first network tunnel peer end, so that the first network tunnel peer end sends, at the third network layer of the first network tunnel peer end, the diagnosis message to a third network layer of the second network tunnel source end.

7. The method according to claim 4, wherein the cross-management domain notification information is carried in a diagnosis message that is sent by each network layer of the first network tunnel source end to the corresponding network layer of the first network tunnel peer end.

8. The method according to claim 1, further comprising:
sending, by the first network tunnel source end, at the first network layer of the first network tunnel source end, the diagnosis message to a third network layer of the first network tunnel source end; and
sending, by the first network tunnel source end, at the third network layer of the first network tunnel source end, the diagnosis message to a third network layer of the first network tunnel peer end, so that the first network tunnel peer end reports, at the third network layer of the first network tunnel peer end, a diagnosis result comprising the characteristic information to the instruction center.

9. The method according to claim 1, wherein the characteristic information comprises tenant information and a test information serial number.

10. An instruction center, comprising: a computing hardware; and a non-transitory computer-readable storage medium including computer-executable instructions executed by the computing hardware to perform, on the instruction center, operations comprising:
sending a network diagnosis instruction to a first network layer of a first network tunnel source end, so that the first network tunnel source end sends, at the first network layer of the first network tunnel source end, a diagnosis message to a first network layer of a first network tunnel peer end and a second network layer of the first network tunnel source end, and the second network layer of the first network tunnel source end sends the diagnosis message to a second network layer of the first network tunnel peer end, wherein the diagnosis message comprises characteristic information;
receiving diagnosis results that are reported by the first network layer of the first network tunnel peer end, the second network layer of the first network tunnel peer end, and a third network layer of the first network tunnel peer end according to the diagnosis message, wherein the diagnosis result comprises the characteristic information;
performing, according to the characteristic information, an association analysis on the diagnosis results that are reported by the first network layer of the first network tunnel peer end, the second network layer of the first network tunnel peer end, and the third network layer of the first network tunnel peer end;
receiving diagnosis results that are reported by a first network layer of a second network tunnel peer end, a second network layer of a second network tunnel peer end, and a third network layer of a second network tunnel peer end according to the diagnosis message, wherein the diagnosis result comprises the characteristic information;
performing, according to the characteristic information, an association analysis on the diagnosis results that are reported by the first network layer of the first network tunnel peer end, the second network layer of the first network tunnel peer end and the third network layer of the first network tunnel peer end and by the first network layer of a second network tunnel peer end, the second network layer of a second network tunnel peer end, and the third network layer of the second network tunnel peer end, wherein the characteristic information is used to associate the diagnosis results reported by the first network layer of the first network tunnel peer end, the second network layer of the first network tunnel peer end, and the third network layer of the first network tunnel peer end and by the first network layer of a second network tunnel peer end, the second network layer of a second network tunnel peer end, and the third network layer of the second network tunnel peer end.

11. A network node device, wherein the network node device is a first network tunnel source end comprising: a computing hardware; and a non-transitory computer-readable storage medium including computer-executable instructions executed by the computing hardware to perform, on the network node device, operations comprising:
receiving, at a first network layer of the first network tunnel source end, a network diagnosis instruction sent by an instruction center;
sending, at the first network layer of the first network tunnel source end, a diagnosis message to a first network layer of a first network tunnel peer end and a second network layer of a first network tunnel source end, wherein the diagnosis message carries characteristic information, so that the first network tunnel peer end reports, at the first network layer of the first network tunnel peer end, a diagnosis result comprising the characteristic information to the instruction center;
sending, at the second network layer of the first network tunnel source end, the diagnosis message to a second network layer of the first network tunnel peer end, so that the first network tunnel peer end reports, at the second network layer of the first network tunnel peer end, a diagnosis result comprising the characteristic information to the instruction center; and
associating, using the characteristic information, the diagnosis results reported by the first network tunnel peer end at the first network layer of the first network tunnel peer end and at the second network layer of the first network tunnel peer end.

12. The device according to claim 11, wherein the operations performed by the computer hardware further comprise:
sending, at the second network layer of the first network tunnel source end, the diagnosis message to a third network layer of the first network tunnel source end; and
sending, at the third network layer of the first network tunnel source end, the diagnosis message to a third network layer of the first network tunnel peer end, so that the first network tunnel peer end reports, at the third network layer of the first network tunnel peer end, a diagnosis result comprising the characteristic information to the instruction center.

13. The device according to claim 12, wherein the first network layer is a tunnel layer, the second network layer is a network protocol layer, and the third network layer is a data link layer.

14. The device according to claim 12, wherein the operations performed by the computer hardware further comprise:
sending, at the first network layer of the first network tunnel source end, cross-management domain notification information to the first network layer of the first network tunnel peer end, so that the first network tunnel peer end sends, at the first network layer of the first network tunnel peer end, the diagnosis message to a first network layer of a second network tunnel source end.

15. The device according to claim 14, wherein the operations performed by the computer hardware further comprise:
sending, at the second network layer of the first network tunnel source end, the cross-management domain notification information to the second network layer of the first network tunnel peer end, so that the first network tunnel peer end sends, at the second network layer of the first network tunnel peer end, the diagnosis message to a second network layer of the second network tunnel source end.

16. The device according to claim 14, wherein the operations performed by the computer hardware further comprise:
sending, by the first network tunnel source end, at the third network layer of the first network tunnel source end, the cross-management domain notification information to the third network layer of the first network tunnel peer end, so that the first network tunnel peer end sends, at the third network layer of the first network tunnel peer end, the diagnosis message to a third network layer of the second network tunnel source end.

17. The device according to claim 14, wherein the cross-management domain notification information is carried in a diagnosis message that is sent by each network layer of the first network tunnel source end to a corresponding network layer of the first network tunnel peer end.

18. The device according to claim 11, wherein the operations performed by the computer hardware further comprise:
sending, at the first network layer of the first network tunnel source end, the diagnosis message to a third network layer of the first network tunnel source end; and
sending, at the third network layer of the first network tunnel source end, the diagnosis message to a third network layer of the first network tunnel peer end, so that the first network tunnel peer end reports, at the third network layer of the first network tunnel peer end, a diagnosis result comprising the characteristic information to the instruction center.

19. The device according to claim 11, wherein the characteristic information comprises tenant information and a test information serial number.

20. The device according to claim 11, wherein the characteristic information is carried in a payload field of the diagnosis message.

\* \* \* \* \*